US010642936B2

(12) United States Patent
Arquero et al.

(10) Patent No.: US 10,642,936 B2
(45) Date of Patent: *May 5, 2020

(54) AUTOMATED MESSAGE SENTIMENT ANALYSIS AND AGGREGATION

(71) Applicant: International Business Machines Corporation, Armonk, NY (US)

(72) Inventors: Gregg M. Arquero, Poughkeepsie, NY (US); Eli M. Dow, Wappingers Falls, NY (US); Syed F. Hossain, Hopewell Junction, NY (US); Joshua Schaeffer, White Plains, NY (US); Yunli Tang, Poughkeepsie, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/275,660

(22) Filed: Sep. 26, 2016

(65) Prior Publication Data

US 2018/0089171 A1 Mar. 29, 2018

(51) Int. Cl.
*G06F 17/27* (2006.01)
*G06Q 10/10* (2012.01)
*H04L 12/58* (2006.01)

(52) U.S. Cl.
CPC ....... *G06F 17/2785* (2013.01); *G06Q 10/107* (2013.01); *H04L 51/22* (2013.01); *H04L 51/26* (2013.01)

(58) Field of Classification Search
CPC .......... G06Q 30/0201; G06Q 30/0255; G06Q 10/10; G06Q 10/0639; G06Q 50/01;
(Continued)

(56) References Cited

U.S. PATENT DOCUMENTS 6,424,997 B1 7/2002 Buskirk et al.
6,816,885 B1 11/2004 Raghunandan
(Continued)

OTHER PUBLICATIONS

Email Sentiment Analysis. (n.d.). Retrieved Sep. 14, 2016, from https://support.getbase.com/hc/en-us/articles/205056535-Email-Sentiment-Analysis.
(Continued)

*Primary Examiner* — Michael Ortiz-Sanchez
(74) *Attorney, Agent, or Firm* — Cantor Colburn LLP; Teddi Maranzano (57) ABSTRACT

Techniques are provided for performing automated operations to analyze and prioritize incoming user messages. One or more indications of a plurality of messages sent to one or more recipient users is received. Based at least in part on one or more natural-language processing libraries, multiple messages of the plurality are analyzed. Analyzing the multiple messages includes determining one or more sentiments associated with each of the multiple messages, and generating, based at least in part on the determining of the one or more sentiments, aggregate sentiment information regarding one or more subsets of the multiple messages. Based at least in part on the analyzing of the received message, indications are provided of the aggregate sentiment information generated regarding one or more subsets of messages.

20 Claims, 4 Drawing Sheets

(58) Field of Classification Search
CPC .. G06Q 10/107; G06Q 30/02; G06Q 30/0269; G06Q 30/0271; H04L 51/08; H04L 51/16; H04N 21/4786; H04N 21/4788; G06F 17/2785; G06F 17/30867; G06F 17/241; G06F 17/3053; G06F 2203/011; G06F 7/24; G06F 17/30528; G06F 17/30997; G06F 3/0482; G06F 17/30684; G06F 17/2775; G06F 17/277; G06F 17/30554; G06F 17/30598; G06F 17/30705; G06F 17/30707; G06F 17/30719; G06F 17/30654; G10L 2015/088; G10L 25/63; G06K 9/00288
See application file for complete search history.

(56) References Cited

U.S. PATENT DOCUMENTS

| | | | |
|---|---|---|---|
| 7,174,366 | B2 | 2/2007 | Chou |
| 7,185,065 | B1* | 2/2007 | Holtzman ............ G06F 17/2745 705/36 R |
| 7,289,949 | B2* | 10/2007 | Warner ................. G06F 17/271 704/9 |
| 7,299,261 | B1 | 11/2007 | Oliver et al. |
| 8,095,613 | B1* | 1/2012 | Perkowitz ............ G06Q 10/109 709/206 |
| 8,645,430 | B2 | 2/2014 | Khouri et al. |
| 9,240,968 | B1 | 1/2016 | Johnson |
| 9,331,965 | B2 | 5/2016 | Caskey et al. |
| 9,336,268 | B1* | 5/2016 | Moudy ............. G06F 17/30412 |
| 9,442,916 | B2 | 9/2016 | O'Sullivan et al. |
| 2002/0169835 | A1 | 11/2002 | Paul |
| 2003/0050778 | A1 | 3/2003 | Nguyen et al. |
| 2005/0223061 | A1* | 10/2005 | Auerbach ............ G06Q 10/107 709/206 |
| 2006/0010217 | A1 | 1/2006 | Sood |
| 2009/0030872 | A1* | 1/2009 | Brezina ................. H04M 15/00 |
| 2009/0055481 | A1 | 2/2009 | Carmel |
| 2011/0320541 | A1 | 12/2011 | Bendel et al. |
| 2012/0005284 | A1 | 1/2012 | Tse |
| 2012/0158868 | A1 | 6/2012 | McAfee et al. |
| 2012/0158989 | A1* | 6/2012 | Patil ....................... G06Q 30/02 709/235 |
| 2012/0191730 | A1* | 7/2012 | Parikh ................. G06Q 30/0201 707/754 |
| 2013/0103667 | A1 | 4/2013 | Minh |
| 2013/0311485 | A1* | 11/2013 | Khan ................... G06F 17/2785 707/755 |
| 2013/0346067 | A1 | 12/2013 | Bhatt |
| 2014/0074945 | A1* | 3/2014 | Kanevsky ............... A61B 5/165 709/206 |
| 2014/0188459 | A1* | 7/2014 | Fink .................... G06F 17/2785 704/9 |
| 2014/0236903 | A1* | 8/2014 | DiRienzo .......... G06F 17/30312 707/661 |
| 2014/0310213 | A1 | 10/2014 | Badger |
| 2015/0039703 | A1 | 2/2015 | Kursun |
| 2015/0058428 | A1 | 2/2015 | Caskey et al. |
| 2015/0120282 | A1* | 4/2015 | Beaumont ........... G06F 17/2264 704/9 |
| 2015/0127591 | A1 | 5/2015 | Gupta et al. |
| 2015/0195406 | A1* | 7/2015 | Dwyer ................ H04M 3/5175 379/265.07 |
| 2015/0200899 | A1 | 7/2015 | Sanketi |
| 2015/0213002 | A1 | 7/2015 | Gou et al. |
| 2015/0269242 | A1* | 9/2015 | Dey ........................ H04L 51/16 707/737 |
| 2015/0278195 | A1* | 10/2015 | Yang .................... G06F 17/2785 704/9 |
| 2015/0286627 | A1 | 10/2015 | Chang et al. |
| 2016/0117591 | A1* | 4/2016 | Naik ......................... G06F 7/24 707/748 |
| 2016/0125751 | A1 | 5/2016 | Barker et al. |
| 2016/0285810 | A1* | 9/2016 | Bai .......................... H04L 51/16 |
| 2016/0328401 | A1 | 11/2016 | Dhawan et al. |
| 2016/0335252 | A1* | 11/2016 | Brunet ................ G06F 17/2785 |
| 2016/0344667 | A1 | 11/2016 | Lane |
| 2017/0046496 | A1* | 2/2017 | Johnstone ........... G06F 19/3406 |
| 2017/0052949 | A1* | 2/2017 | Baldwin ............. G06F 17/2785 |
| 2017/0075978 | A1* | 3/2017 | Zhang ................. G06N 99/005 |
| 2017/0161372 | A1* | 6/2017 | Fern ndez ............ G06F 17/218 |
| 2017/0243120 | A1* | 8/2017 | Doan ................... G06N 99/005 |
| 2017/0364797 | A1* | 12/2017 | Pal ............................ G06N 3/08 |
| 2018/0089168 | A1* | 3/2018 | Arquero ............... G06F 17/2264 |
| 2018/0232362 | A1* | 8/2018 | Khan .................... G06F 17/2785 |
| 2018/0239815 | A1* | 8/2018 | Yi ....................... G06K 9/00429 |

OTHER PUBLICATIONS

Arquero, Gregg M. et al., "Automated Receiver Message Sentiment Analysis, Classification and Prioritization" U.S. Appl. No. 15/275,658, filed Sep. 26, 2016.

Arquero, Gregg M. et al., "Automatic Summarization of Emails and Generation of Subject Lines," U.S. Appl. No. 15/379,867, filed Dec. 15, 2016.

List of IBM Patents or Patent Applications Treated as Related; Date Filed: Sep. 26, 2016, pp. 1-2.

Lanjewar, Bhavana "Automatic text summarization with context based keyword extraction", International Journal of Advanced Research in Computer Science and Management Studies, vol. 3, Issue 5, May 2015; 9 pgs.

* cited by examiner

AUTOMATED MESSAGE SENTIMENT ANALYSIS AND AGGREGATION

BACKGROUND

This disclosure relates to a method and a system to perform automated operations for incorporating automated sentiment analysis and aggregated sentiment analysis of incoming messages intended for recipient users.

Reading through all the messages we receive on a daily or weekly basis is time-consuming. Such messages typically include extraneous information the recipient user does not care about, but which the recipient user must at least skim in order to locate and identify any information in the message that is relevant and/or important. Such messages may also contain, individually and in the aggregate, useful sentiment information that may not be properly utilized by the recipient user or their organization.

SUMMARY

According to at least one embodiment, a method for providing aggregate sentiment information regarding user messages is provided. The method is implemented by one or more computing systems and comprises receiving one or more indications of a plurality of messages sent to one or more recipient users. The method further comprises analyzing, based at least in part on one or more natural-language processing libraries, multiple messages of the plurality. Analyzing the multiple messages includes determining one or more sentiments associated with each of the multiple messages, and generating, based at least in part on the determining of the one or more sentiments, aggregate sentiment information regarding one or more subsets of the multiple messages. The method further comprises providing, for at least one of the subsets of multiple messages, one or more indications of the aggregate sentiment information generated regarding the subset of multiple messages.

According to another embodiment, a non-transitory computer-readable storage medium has stored contents that, when executed, configures a computing system to perform a method for providing aggregate sentiment information regarding user messages that includes receiving one or more indications of a plurality of messages sent to one or more recipient users. The method further comprises analyzing, based at least in part on one or more natural-language processing libraries, multiple messages of the plurality. Analyzing the multiple messages includes determining one or more sentiments associated with each of the multiple messages, and generating, based at least in part on the determining of the one or more sentiments, aggregate sentiment information regarding one or more subsets of the multiple messages. The method further comprises providing, for at least one of the subsets of multiple messages, one or more indications of the aggregate sentiment information generated regarding the subset of multiple messages.

According to another embodiment, a computing system comprises one or more processors and at least one memory that includes instructions that, upon execution by a processor, cause the computing system to perform a method for providing aggregate sentiment information regarding user messages. The method comprises receiving one or more indications of a plurality of messages sent to one or more recipient users. The method further comprises analyzing, based at least in part on one or more natural-language processing libraries, multiple messages of the plurality. Analyzing the multiple messages includes determining one or more sentiments associated with each of the multiple messages, and generating, based at least in part on the determining of the one or more sentiments, aggregate sentiment information regarding one or more subsets of the multiple messages. The method further comprises providing, for at least one of the subsets of multiple messages, one or more indications of the aggregate sentiment information generated regarding the subset of multiple messages.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

DETAILED DESCRIPTION

One or more embodiments described herein enable one or more processor-based computing systems to perform techniques incorporating automated sentiment analysis of incoming messages intended for one or more users, including aggregated sentiment analysis of multiple such messages. Sentiment data generated based on such user messages may provide both recipient users and their organizations with beneficial information, such as a variety of organizational message analytics. Such analytics may, for example, be beneficial for determining employee satisfaction, stress levels, overall satisfaction of message recipients or senders, etc. In one or more embodiments, some or all of the techniques described herein may be performed by a Message Sentiment, Classification, and Prioritization (MSCP) system.

Aspects of particular techniques described herein may also be described within U.S. Patent Application No. 15/275, 658, Now U.S. Pat. No. 10/007,661 B2, entitled "AUTOMATED RECEIVER MESSAGE SENTIMENT ANALYSIS, CLASSIFICATION AND PRIORITIZATION," which is hereby incorporated herein in its entirety.

As used herein, the term "message" refers to any text-based communication intended for a user, and may in at least some embodiments include multimedia messages, e-mail messages, and textual messages that include additional non-text items.

In certain embodiments, the MSCP system may operate in conjunction with an email application associated with a user that is the recipient of one or more messages received for analysis by the MSCP system, such as via a software application plugin executed in conjunction with the email application.

Figure 1:
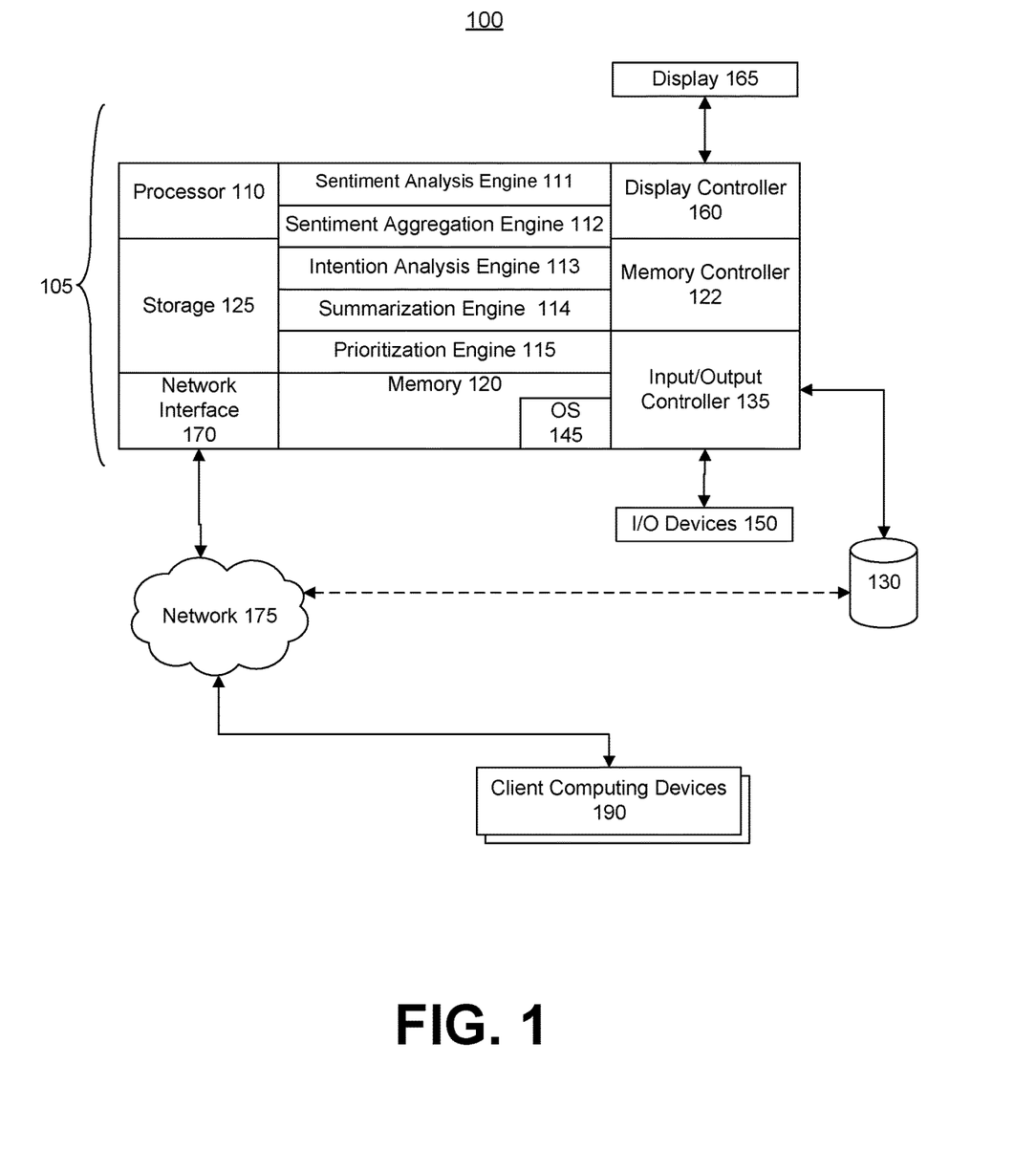
FIG. 1 depicts a block diagram of an exemplary network environment and computing system in accordance with an embodiment.

FIG. 1 illustrates a block diagram of a networked computing system 100 for use as an MSCP system in performing various techniques described herein. Such techniques may be performed or otherwise implemented via hardware, software (e.g., firmware), or combination thereof. In an exemplary embodiment, the methods described herein are implemented in hardware as the depicted MSCP system, which may include the microprocessor of a special or general-purpose digital computer, such as a personal computer, workstation, minicomputer, or mainframe computer. The computing system 100 therefore includes computer 105.

In the illustrated embodiment of FIG. 1, the computer 105 includes a processor 110, a sentiment analysis engine 111, a sentiment aggregation engine 112, an intention analysis engine 113, a prioritization engine 114, a memory 115 coupled to a memory controller 120, internal storage 125, and one or more input and/or output (I/O) devices 150 that are communicatively coupled to the computer 105 via a local input/output controller 135, which in the illustrated embodiment is further communicatively coupled to external storage 130. The input/output controller 135 may include one or more buses or other wired or wireless connections, as is known in the art. The input/output controller 135 may further include additional elements, which are omitted for simplicity, such as controllers, buffers (caches), drivers, repeaters, and receivers, to facilitate communications. Further, the local interface may include address, control, and/or data connections to facilitate appropriate communications among the aforementioned components.

Also in the illustrated embodiment, the processor 110 is a hardware device for executing hardware instructions or software, particularly that stored in memory 115. The processor 110 can be any custom made or commercially available processor, a central processing unit (CPU), an auxiliary processor among several processors associated with the general-purpose computer 105, a semiconductor based microprocessor (in the form of a microchip or chip set), a macroprocessor, or generally any device for executing instructions.

The memory 115 can include any one or combination of volatile memory elements (e.g., random access memory (RAM, such as DRAM, SRAM, SDRAM, etc.)) and nonvolatile memory elements (e.g., ROM, erasable programmable read only memory (EPROM), electronically erasable programmable read only memory (EEPROM), programmable read-only memory (PROM), tape, compact disc read only memory (CD-ROM), disk, diskette, cartridge, cassette or the like, etc.). Moreover, the memory 115 may incorporate electronic, magnetic, optical, and/or other types of storage media. Note that the memory 115 can have a distributed architecture, where various components are situated remote from one another, but can be accessed by the processor 110.

The instructions in the memory 115 may include one or more separate programs, each of which comprises an ordered listing of executable instructions for implementing logical functions. In the example of FIG. 1, the instructions in the memory 115 include a suitable operating system (OS) 145. The operating system 145 typically controls the execution of other computer programs and may, among other capabilities, provide scheduling, input-output control, file and data management, memory management, and communication control and related services.

In an exemplary embodiment, I/O devices 150 may include, as non-limiting examples, a keyboard, mouse, printer, scanner, microphone, a network interface card (NIC) or modulator/demodulator (for accessing other files, devices, systems, or a network), a radio frequency (RF) or other transceiver, a telephonic interface, a bridge, a router, and other peripherals communicatively coupled to the computer 105 via input/output controller 135. In the depicted embodiment, the computing system 100 further includes a display controller 160 coupled to a display 165, and a network interface 170 communicatively coupled to a network 175. In the depicted embodiment, one or more client computing devices 190 are communicatively coupled to the network 175, such as client computing devices associated with users who interact with the MSCP system in order to have the MSCP system perform various operations regarding messages directed to those or other users, or to receive information from the MSCP system regarding individual messages, multiple messages, or subsets thereof.

The network 175 may be an IP-based network for communication between computer 105 and any external server, client and the like via a broadband or other network connection. The network 175 transmits and receives data between the computer 105 and external systems. In an exemplary embodiment, the network 175 may be a managed IP network administered by a service provider. The network 175 may be implemented in a wireless fashion, e.g., using wireless protocols and technologies, such as WiFi, WiMax, etc. The network 175 may also be a packet-switched network such as a local area network, wide area network, metropolitan area network, Internet network, or other similar type of network environment. The network 175 may be a fixed wireless network, a wireless local area network (LAN), a wireless wide area network (WAN) a personal area network (PAN), a virtual private network (VPN), intranet or other suitable network system and includes equipment for receiving and transmitting signals.

In at least some embodiments, the memory 115 may further include a basic input output system (BIOS) (omitted for simplicity). The BIOS is a set of routines that initialize and test hardware at startup, initiate execution of the OS 145, and support the transfer of data among the hardware devices. The BIOS is typically stored in ROM so that the BIOS may be executed when the computer 105 is activated. When the computer 105 is in operation, the processor 110 is configured to execute instructions stored within the memory 115, to communicate data to and from the memory 115, and to generally control operations of the computer 105 pursuant to the instructions.

Figure 2:
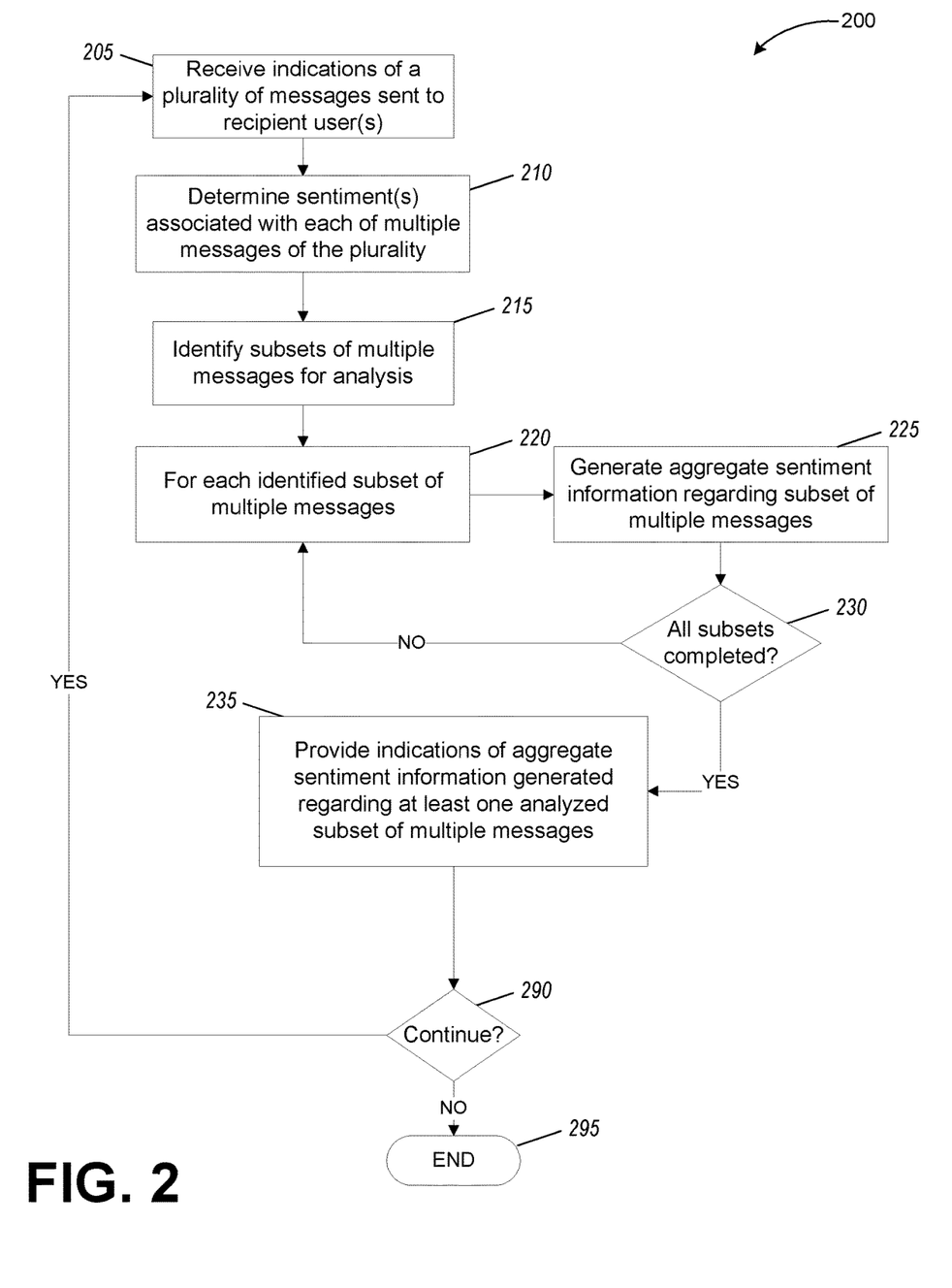
FIG. 2 depicts a process flow for a Message Sentiment, Classification, and Prioritization (MSCP) system in accordance with an embodiment of techniques described herein.

FIG. 2 depicts a process flow routine 200 for an MSCP System in accordance with an embodiment of techniques described herein. The routine begins at block 205, in which the MSCP system receives indications of a plurality of messages sent to one or more user recipients of the MSCP system. At block 210, the MSCP system begins analyzing the indicated messages by determining (such as via sentiment analysis engine 111 of FIG. 1) one or more sentiments associated with each of multiple of the received messages, such as in accordance with preference information or other configuration settings associated with and/or provided by the user recipients. Examples of intentions may include, as non-limiting examples: anger, sadness, frustration, happiness, satisfaction, etc. In various embodiments and circumstances, one or more of these and other exemplary intentions may be determined by the MSCP system to be appropriately associated with the received message.

At block 215, the MSCP system identifies one or more subsets of messages for sentiment analysis. For example, in one or more embodiments, the MSCP system may identify subsets of messages based at least in part on keywords or individual sentiments common to such messages; based on one or more particular user recipients associated with such messages; based on one or more particular senders associated with such messages; based on a time period in which such messages were received and/or sent; etc.

In at least some embodiments, the MSCP system may receive one or more search parameters in order to identify particular subsets of messages determined to be of interest to a user or entity providing such search parameters. In response to such search parameters, the MSCP system may provide an indication of one or more sentiments determined to be associated with the search parameter and/or with messages of the identified subset.

At block 220, the MSCP system continues analyzing the plurality of indicated messages. Such analysis includes, for each identified subset of messages, generating (such as via sentiment aggregation engine 112 of FIG. 1) aggregate sentiment information regarding the subset at block 225. At block 230, the MSCP system determines whether such aggregated sentiment analysis of all identified subsets is complete. If not, the MSCP system returns to block 220 to perform such analysis on the next identified subset.

Once the aggregated sentiment analysis has been completed for all identified subsets, the MSCP system proceeds to block 235, in which it provides indications of aggregate sentiment information generated regarding at least one subset of messages. For example, in one or more embodiments, the MSCP system may provide at least some of the aggregate sentiment information to particular recipient users associated with such messages, and/or users other than the recipient users to which the messages were directed. In one or more embodiments, the MSCP system may display statistical data regarding one or more sentiments associated with an identified subset of messages, all messages analyzed in a particular period of time, or the entirety of the plurality of messages indicated in block 205. In certain embodiments, the MSCP system may provide such indications at preset intervals, such as periodically in accordance with configuration information that may be associated with the MSCP system or particular users thereof.

In block 290, the MSCP system determines whether it is to continue, such as in response to receiving an explicit indication to terminate. If it determines to continue, the MSCP system routine returns to block 205 to await further indications of additional messages sent to recipient users of the MSCP system. Otherwise, the MSCP system may end operations of the depicted and/or other routines as appropriate, as shown at block 295.

Figure 3:
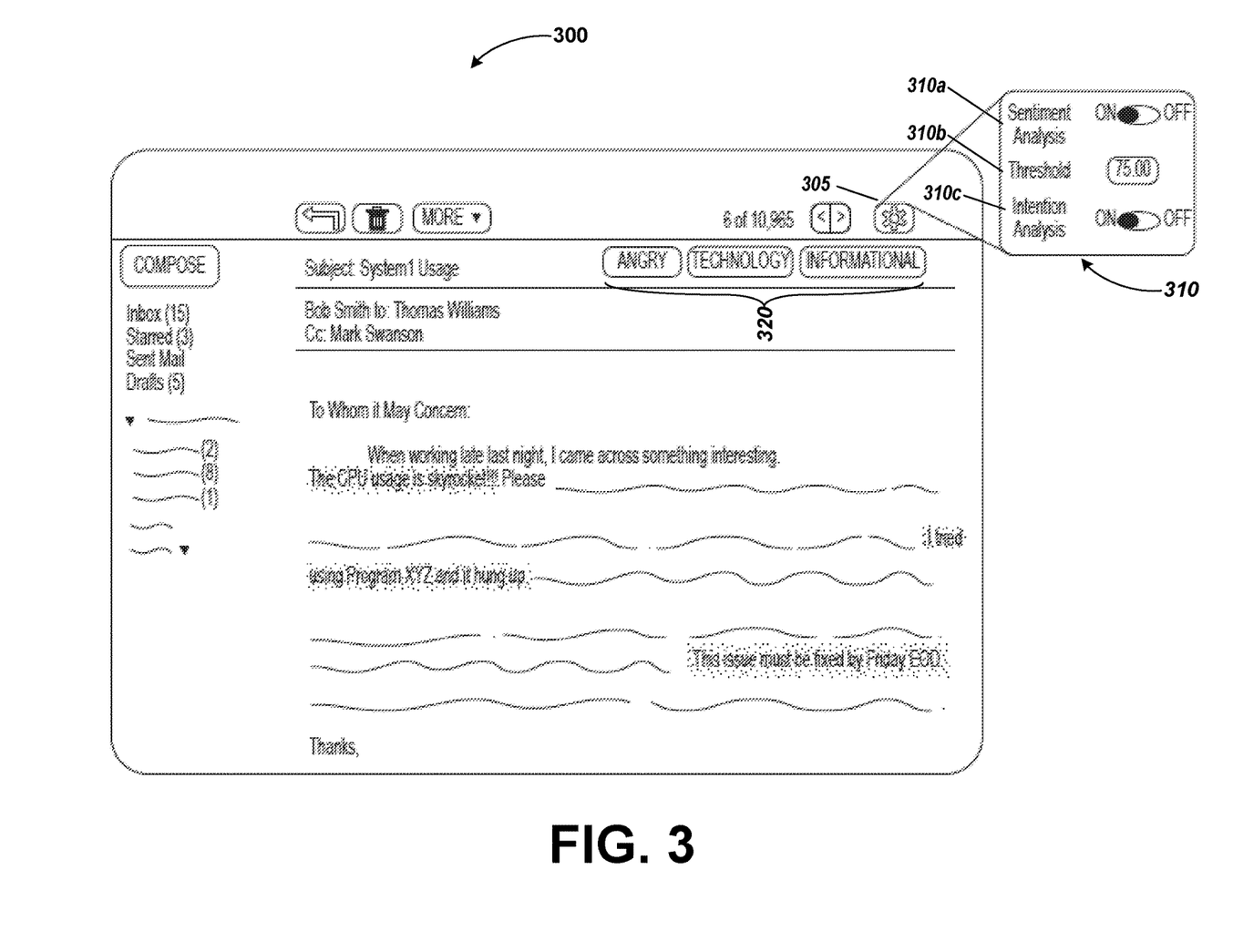
FIGS. 3 and 4 depict portions of a graphical user interface provided by an MSCP system in accordance with an embodiment of techniques described herein.

FIG. 3 depicts a portion of a graphical user interface (GUI) 300 provided by an MSCP system in accordance with an embodiment of techniques described herein. In particular, GUI 300 depicts the display of a message intended for a user recipient, in which the MSCP system has incorporated multiple elements regarding the analysis of the displayed message.

In the depicted embodiment, the GUI 300 includes a settings control 305 that, when activated, initiates the display of settings panel 310. The settings panel 310 includes sentiment analysis control 310a, which in the depicted embodiment operates as a toggle switch selectively enabling or disabling sentiment analysis to be performed on incoming messages by the MSCP system; threshold selector control 310b, which in the depicted embodiment allows the user to enter a threshold value for determining, for example, a degree to which summarization, sentiment analysis, and/or sentence extraction is to be performed on incoming messages by the MSCP system; and intention analysis control 310c, which in the depicted embodiment operates as a toggle switch enabling or disabling intention analysis to be performed on incoming messages by the MSCP system (similar to sentiment analysis control 310a).

The GUI 300 of FIG. 3 further includes sentiment indicators 320, which provide an indication to the user of those sentiments determined to be associated with the displayed message. In particular, in the illustrated example, sentiment indicators 320 indicate that the received message is associated with the sentiments "angry," "technology," and "informational." Thus, in the depicted example and in one or more additional embodiments, the MSCP system may determine sentiments (such as "technology" and "informational") other than those evidencing human emotions.

Figure 4:
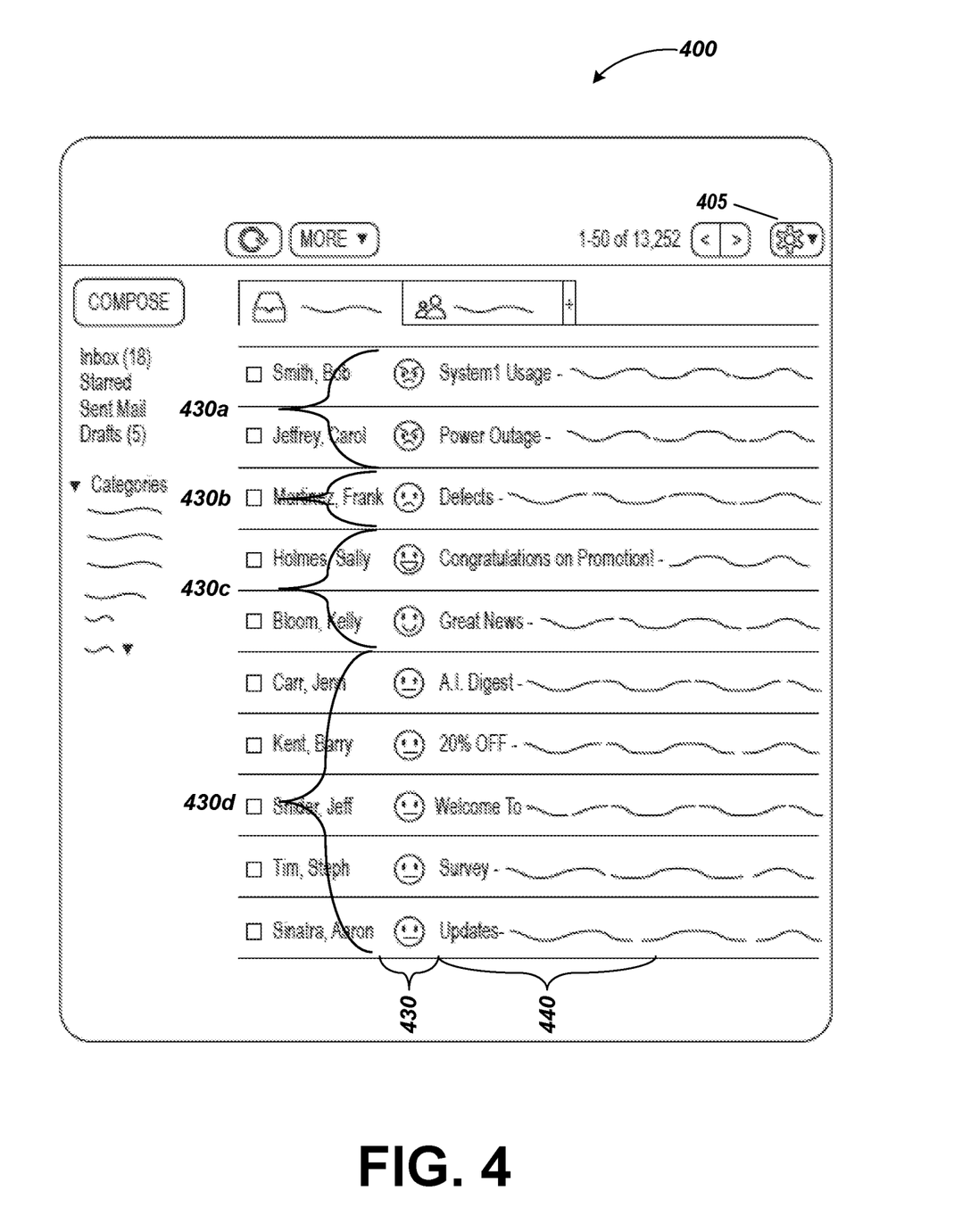

FIG. 4 depicts a portion of a graphical user interface (GUI) 400 provided by an MSCP system in accordance with an embodiment of techniques described herein. In particular, GUI 400 depicts the display of a prioritized list of multiple messages that have been analyzed by the MSCP system, such as in accordance with user preference information or other configuration information. Such preferences and/or configuration may at least in part be selected by the user, such as by use of settings control 405 in a manner similar to that described with respect to settings control 305 in FIG. 3.

In the depicted embodiment, the GUI 400 includes sentiment indicators 430, which in the current example provide graphical indicators associated with particular sentiments. In the illustrated example, the MSCP system has prioritized the display of email messages associated with negative sentiments. In particular, the topmost messages are associated with angry sentiments 430a, with subsequent messages being successively associated with unhappy sentiments 430b, positive sentiments 430c, and neutral sentiments 430d. Also in the depicted embodiment, GUI 400 further includes intention indicators 440, which the MSCP system has provided as the results of intention analysis for each of the multiple messages listed.

In one or more embodiments, various implementations of the types of analysis described above may be performed in conjunction with one or more previously published or open source programming libraries (such as one or more APIs) that may perform and/or utilize natural-language processing. For example, in certain embodiments, the MSCP system may utilize one or more of the Alchemy API, the MALLET library, or other programming library.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

It will be appreciated that in some embodiments the functionality provided by the routine or routines discussed above may be provided in alternative ways, such as being split among more routines or consolidated into fewer routines. Similarly, in some embodiments illustrated routines may provide more or less functionality than is described, such as when other illustrated routines instead lack or include such functionality respectively, or when the amount of functionality that is provided is altered. In addition, while various operations may be illustrated as being performed in a particular manner (e.g., in serial or in parallel) and/or in a particular order, it will be appreciated that in other embodiments the operations may be performed in other orders and in other manners. It will also be appreciated that particular data structures discussed above may be structured in different manners, such as by having a single data structure split into multiple data structures or by having multiple data structures consolidated into a single data structure. Similarly, in some embodiments, illustrated data structures may store more or less information than is described, such as when other illustrated data structures instead lack or include such information respectively, or when the amount or types of information that are stored is altered.

The present invention may be a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as "C" or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure Aspects of the present disclosure are described herein with reference to flowchart illustrations and/or block diagrams of methods, apparatus (systems), and computer program products according to embodiments of the present disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer-implemented method for providing aggregate sentiment information regarding user email messages, the method comprising:
receiving, by a hardware-implemented message sentiment classification and prioritization system comprising a hardware-implemented sentiment analysis engine and a hardware-implemented sentiment aggregation engine, one or more indications of a plurality of email messages sent to one or more recipient users, wherein the hardware-implemented message sentiment classification and prioritization system comprises a microprocessor of a special-purpose computer;
analyzing, by the message sentiment classification and prioritization system and based at least in part on one or more natural-language processing libraries, multiple email messages of the plurality of email messages, wherein analyzing the multiple email messages includes:
  determining, by the message sentiment classification and prioritization system, a plurality of sentiments associated with the multiple email messages, wherein the plurality of sentiments comprise an angry sentiment, an unhappy sentiment, and a neutral sentiment;
  performing intention analysis of received email message in order to determine one or more intentions associated with the received email message;
  identifying a plurality of subsets of the multiple email messages, wherein each subset comprises a plurality of email messages and the email messages of each subset are complete email messages;
generating, by the message sentiment classification and prioritization system and based at least in part on the determining of the one or more sentiments, aggregate sentiment information regarding the plurality of subsets of the multiple email messages, wherein the aggregate sentiment information comprises an aggregation of sentiment information from the plurality of email messages of each subset, and each subset of the multiple email messages is associated with a sentiment;
providing, by the message sentiment classification and prioritization system and for at least one subset of multiple email messages, one or more indications of the aggregate sentiment information generated regarding the at least one subset;
displaying the plurality of subsets of the multiple email messages via a display, wherein the topmost messages are associated with the angry sentiment, with subsequent messages being successively associated with the unhappy sentiment and the neutral sentiment, wherein the multiple email messages of each of the plurality of subsets are grouped together and each of the plurality of subsets that are grouped together are displayed in a sequential manner in the display;
selectively enabling and disabling, by a user, the analysis performed by the message sentiment classification and prioritization system; and
threshold selector controller for selecting a threshold value for determining at least one of a summarization, summary analysis, or sentence extraction to be performed on incoming messages by the sentiment classification and prioritization system, wherein the threshold selector controller is presented on a user interface display.

2. The computer-implemented method of claim 1 wherein the method is performed at least in part via a software application plug-in executed in conjunction with an email client associated with each of at least some of the one or more recipient users.

3. The computer-implemented method of claim 1 wherein generating the aggregate sentiment information regarding the subset of multiple email messages includes extracting one or more keywords associated with a sentiment that is determined to be associated with each of the email messages of the subset.

4. The computer-implemented method of claim 1 wherein providing the one or more indications of the aggregate sentiment information generated regarding the subset of multiple email messages includes displaying statistical data regarding one or more sentiments associated with the multiple email messages of the plurality.

5. The computer-implemented method of claim 1 wherein providing the one or more indications of the aggregate sentiment information generated regarding the subset of multiple email messages includes providing at least some of the aggregate sentiment information to one or more users other than the one or more recipient users.

6. The computer-implemented method of claim 1 wherein the method further comprises, subsequent to the generating of the aggregate sentiment information, receiving a search parameter and responding by providing an indication of one or more sentiments determined to be associated with the search parameter in accordance with at least some of the multiple email messages of the plurality.

7. The computer-implemented method of claim 1 wherein providing the one or more indications of the aggregate sentiment information generated regarding the subset of multiple email messages is performed periodically in accordance with configuration information associated with at least some of the one or more recipient users.

8. A non-transitory computer-readable medium having stored contents that, when executed, configure a computing system to perform a method for providing aggregate sentiment information regarding user email messages, the method comprising:
receiving, by a hardware-implemented message sentiment classification and prioritization system comprising a hardware-implemented sentiment analysis engine and a hardware-implemented sentiment aggregation engine, one or more indications of a plurality of email messages sent to one or more recipient users, wherein the hardware-implemented message sentiment classification and prioritization system comprises a microprocessor of a special-purpose computer;
analyzing, by the message sentiment classification and prioritization system and based at least in part on one or more natural-language processing libraries, multiple email messages of the plurality of email messages, wherein analyzing the multiple email messages includes:
  performing intention analysis of received email message in order to determine one or more intentions associated with the received email message;
  determining, by the message sentiment classification and prioritization system, a plurality of sentiments associated with the multiple email messages, wherein the plurality of sentiments comprise an angry sentiment, an unhappy sentiment, and a neutral sentiment;
  identifying a plurality of subsets of the multiple email messages, wherein each subset comprises a plurality of email messages and the email messages of each subset are complete email messages;

generating, by the message sentiment classification and prioritization system and based at least in part on the determining of the one or more sentiments, aggregate sentiment information regarding the plurality of subsets of the multiple email messages, wherein the aggregate sentiment information comprises an aggregation of sentiment information from the plurality of email messages of each subset, and each subset of the multiple email messages is associated with a sentiment;

providing, by the message sentiment classification and prioritization system and for at least one subset of multiple email messages, one or more indications of the aggregate sentiment information generated regarding the at least one subset;

displaying the plurality of subsets of the multiple email messages via a display, wherein the topmost messages are associated with the angry sentiment, with subsequent messages being successively associated with the unhappy sentiment and the neutral sentiment, wherein the multiple email messages of each of the plurality of subsets are grouped together and each of the plurality of subsets that are grouped together are displayed in a sequential manner in the display;

selectively enabling and disabling, by a user, the analysis performed by the message sentiment classification and prioritization system; and threshold selector controller for selecting a threshold value for determining at least one of a summarization, summary analysis, or sentence extraction to be performed on incoming messages by the sentiment classification and prioritization system, wherein the threshold selector controller is presented on a user interface display.

9. The non-transitory computer-readable medium of claim 8 wherein the method is performed at least in part via a software application plug-in executed in conjunction with an email client associated with each of at least some of the one or more recipient users.

10. The non-transitory computer-readable medium of claim 8 wherein generating the aggregate sentiment information regarding the subset of multiple email messages includes extracting one or more keywords associated with a sentiment that is determined to be associated with each of the email messages of the subset.

11. The non-transitory computer-readable medium of claim 8 wherein providing the one or more indications of the aggregate sentiment information generated regarding the subset of multiple email messages includes displaying statistical data regarding one or more sentiments associated with the multiple email messages of the plurality.

12. The non-transitory computer-readable medium of claim 8 wherein providing the one or more indications of the aggregate sentiment information generated regarding the subset of multiple email messages includes providing at least some of the aggregate sentiment information to one or more users other than the one or more recipient users.

13. The non-transitory computer-readable medium of claim 8 wherein the method further comprises, subsequent to the generating of the aggregate sentiment information, receiving a search parameter and responding by providing an indication of one or more sentiments determined to be associated with the search parameter in accordance with at least some of the multiple email messages of the plurality.

14. The non-transitory computer-readable medium of claim 8 wherein providing the one or more indications of the aggregate sentiment information generated regarding the subset of multiple email messages is performed periodically in accordance with configuration information associated with at least some of the one or more recipient users.

15. A system, comprising:
one or more processors;
a hardware-implemented sentiment analysis engine;
a hardware-implemented sentiment aggregation engine, wherein the hardware-implemented sentiment analysis engine and the hardware-implemented sentiment aggregation engine comprise at least one special-purpose computer; and
at least one memory, the memory including instructions that, upon execution by at least one of the one or more processors, cause the system to perform a method for providing aggregate sentiment information regarding user email messages, the method comprising:
receiving one or more indications of a plurality of email messages sent to one or more recipient users;
analyzing, based at least in part on one or more natural-language processing libraries, multiple email messages of the plurality of email messages, wherein analyzing the multiple email messages includes:
performing intention analysis of received email message in order to determine one or more intentions associated with the received email message;
determining a plurality of sentiments associated with the multiple email messages, wherein the plurality of sentiments comprise an angry sentiment, an unhappy sentiment, and a neutral sentiment;
identifying a plurality of subsets of the multiple email messages, wherein each subset comprises a plurality of email messages and the email messages of each subset are complete email messages;
generating, based at least in part on the determining of the one or more sentiments, aggregate sentiment information regarding the plurality of subsets of the multiple email messages, wherein the aggregate sentiment information comprises an aggregation of sentiment information from the plurality of email messages of each subset, and each subset of the multiple email messages is associated with a sentiment;
providing, for at least one subset of multiple email messages, one or more indications of the aggregate sentiment information generated regarding the at least one subset;
displaying the plurality of subsets of the multiple email messages via a display, wherein the topmost messages are associated with the angry sentiment, with subsequent messages being successively associated with the unhappy sentiment and the neutral sentiment, wherein the multiple email messages of each of the plurality of subsets are grouped together and each of the plurality of subsets that are grouped together are displayed in a sequential manner in the display;
selectively enabling and disabling, by a user, the analysis performed by the message sentiment classification and prioritization system; and
threshold selector controller for selecting a threshold value for determining at least one of a summarization, summary analysis, or sentence extraction to be performed on incoming messages by the sentiment classification and prioritization system, wherein the threshold selector controller is presented on a user interface display.

16. The system of claim 15 wherein the method is performed at least in part via a software application plug-in executed in conjunction with an email client associated with each of at least some of the one or more recipient users.

17. The system of claim 15 wherein generating the aggregate sentiment information regarding the subset of multiple email messages includes extracting one or more keywords associated with a sentiment that is determined to be associated with each of the email messages of the subset.

18. The system of claim 15 wherein providing the one or more indications of the aggregate sentiment information generated regarding the subset of multiple email messages includes displaying statistical data regarding one or more sentiments associated with the multiple email messages of the plurality.

19. The system of claim 15 wherein providing the one or more indications of the aggregate sentiment information generated regarding the subset of multiple email messages includes providing at least some of the aggregate sentiment information to one or more users other than the one or more recipient users.

20. The system of claim 15 wherein the method further comprises, subsequent to the generating of the aggregate sentiment information, receiving a search parameter and responding by providing an indication of one or more sentiments determined to be associated with the search parameter in accordance with at least some of the multiple email messages of the plurality.

* * * * *